United States Patent [19]

Stuart-Webb

[11] 4,296,217

[45] Oct. 20, 1981

[54] AROMATIC POLYETHERSULPHONES HAVING —OCH$_2$COR END GROUPS

[75] Inventor: John Stuart-Webb, Welwyn Garden City, England

[73] Assignee: Imperial Chemical Industries Limited, London, England

[21] Appl. No.: 14,249

[22] Filed: Feb. 22, 1979

[30] Foreign Application Priority Data

Feb. 28, 1978 [GB] United Kingdom ................. 7865/78

[51] Int. Cl.$^3$ ............................................. C08G 65/48
[52] U.S. Cl. .................................... 525/390; 428/411; 428/426; 525/397; 525/534; 525/535; 528/125; 528/126; 528/128; 528/173; 528/174; 528/175; 528/212; 528/219
[58] Field of Search ............... 528/125, 126, 174, 175, 528/219, 173, 128, 212; 525/390, 397, 534, 535

[56] References Cited

U.S. PATENT DOCUMENTS

| | | | |
|---|---|---|---|
| 4,105,635 | 8/1978 | Freeman | 528/126 |
| 4,105,636 | 8/1978 | Taylor | 528/126 |
| 4,108,837 | 8/1978 | Johnson et al. | 528/126 |

*Primary Examiner*—Harold D. Anderson
*Attorney, Agent, or Firm*—Cushman, Darby & Cushman

[57] ABSTRACT

Aromatic polyethersulphones that are particularly useful as adhesives and coatings having end groups of formula —OCH$_2$COR, where R is alkyl or alkoxy. Preferred examples are —OCH$_2$COCH$_3$ and —OCH$_2$COOC$_2$H$_5$. Such polymers may be made by heating polyethersulphones made from halophenates or bisphenate/dihalide mixtures, in the presence of a reagent of formula XCH$_2$COR (X is halogen, preferably chlorine), such as chloroacetone or ethyl chloroacetate, for a short period of time. Such polymers of molecular weight (RV<0.25) are of particular use in coating compositions comprising a dispersion of a fluorocarbon polymer dispersed in a solution or dispersion of the polyethersulphone.

6 Claims, No Drawings

AROMATIC POLYETHERSULPHONES HAVING —OCH₂COR END GROUPS

This invention relates to aromatic polyethersulphones. In our British patent specification No. 1 342 589 we describe adhesive compositions and coatings containing polyethersulphones having hydroxyl end groups. We have now found that polyethersulphones having certain other end groups, may give superior results.

In our Belgium Pat. No. 863 311 there is disclosed polyethersulphones having methylsulphinylmethyl (CH₃SOCH₂—), termed dimsyl, end groups which provide coatings of excellent adhesion and which are superior in that they do not exhibit cracking on the microscopic scale. While such polyethersulphones are of undoubted utility, their method of preparation, which involves heating an alkali metal halophenate, or a mixture of substantially equimolar proportions of an alkali metal bisphenate (or bisphenol plus alkali metal carbonate or bicarbonate) and a dihalobenzenoid compound in the presence of dimethyl sulphoxide for prolonged periods of time, e.g. for at least 12 hours and typically for at least 36 hours, (the halogen atoms in the halophenate or dihalobenzenoid compound being activated by —SO₂— groups ortho or para thereto), tends to be uneconomic in view of the very long heating period that is required. Moreover, the polymers have an undesirable smell due to the presence of decomposition products from the dimethyl sulphoxide.

According to the present invention there is provided an aromatic polyethersulphone containing repeat units of the general formula:

—E—O—E'—O— or where E is the same as E',

—E—O— where E and E' are as hereinafter defined, in which an effective number (as defined hereinafter) of the end group of the polymer are or contain groups having the formula-OCH₂COR where R is alkyl or alkoxyl, preferable lower alkyl or lower alkoxyl. Examples for R include methyl, ethyl, methoxy and ethoxy. Preferably the polymer contains at least three such end groups per 100 repeat units.

Preferred examples for the above formula include-OCH₂COCH₃ and —OCH₂COOC₂H₅.

The end groups preferably have the formula:

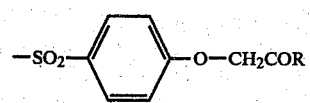

We also provide a coating or adhesive composition comprising said aromatic polyethersulphone as defined above dissolved or dispersed in a liquid medium.

According to a further aspect of the invention we provide a solid surface coated with, or bonded to another surface by means of, such an adhesive composition comprising an aromatic polyethersulphone as defined above.

Aromatic polyethersulphones are polymeric materials containing repeat units of the general formula:

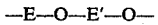
—E—O—E'—O— or, where E is the same as E',

—E—O— in which E is the residuum notionally obtainable by removal of the halogen atoms of a dihalobenzenoid compound in which each halogen atom is activated by an —SO₂⁻ group ortho or para thereto, and E' is the residuum notionally obtainable by removal of the hydroxyl groups from a bisphenol. E and E' may be the same or different and indeed E and/or E' may vary from unit to unit in the polymer chain.

Where E is the same as E', it may be alternatively considered to be the residuum notionally obtainable from the removal of the halogen atom and the hydroxyl group from a halophenol in which the halogen atom is activated by an —SO₂— group ortho or para thereto. Up to 50% of the —SO₂— groups in E, or E and E', may be replaced by —CO— groups.

The residue E preferably has the structure

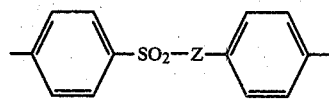

where Z is a direct link or —Ar—SO₂— where Ar is a divalent aromatic radical such as biphenylylene

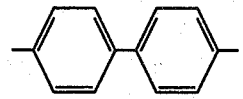

Examples of such polyethersulphones have the repeating units

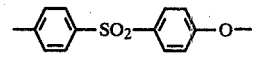

and

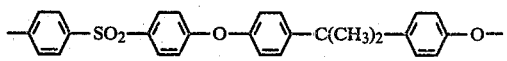

Other polymers incorporate

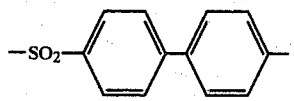

units in the polymer chain, e.g. to give the repeat units

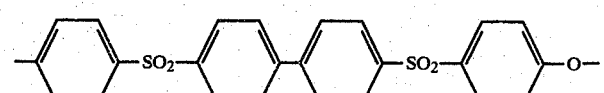

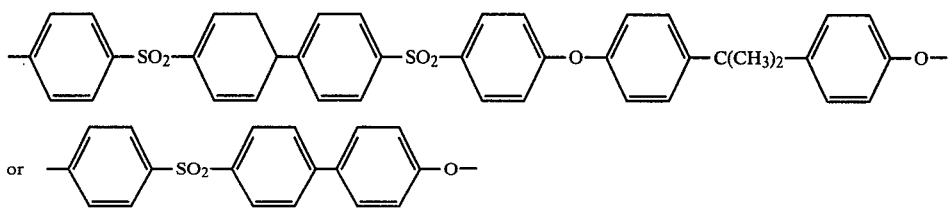

or 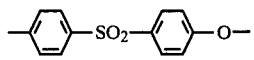

which may be present by themselves or in conjunction with repeat units such as

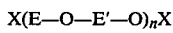

and

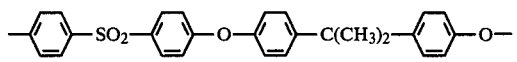

Examples of polyethersulphones and processes for their production are described in British patent specifications Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821, and 1 303 252, Canadian patent specification No. 847 963, Germany OLS specification Nos. 1 938 806 and 2 433 400 and Swiss patent specification No. 491 981.

The polymers in accordance with the present invention can therefore be designated as having the formula X(E—O—E'—O)$_n$X or, where E is the same as E', as X(E—O)$_n$X where n is an integer, groups X are or are part of the polymer end groups, and an effective number of the end groups (preferably three per 100 repeat units) are, or contain, the structure

—OCH$_2$COR

The polyethersulphones of the present invention may be made by first preparing a polyethersulphone by heating an alkali metal halophenate (made by reacting e.g. a dihalobenzenoid compound and an alkali metal hydroxide), or a mixture of substantially equimolar proportions of an alkali metal bisphenate (or bisphenol plus alkali metal carbonate or bicarbonate) and a dihalobenzenoid compound, in which halophenate or dihalobenzenoid compound each halogen atom is activated by an —SO$_2$— group ortho or para thereto (some, up to 50%, of the —SO$_2$— groups may be replaced by —CO— groups), and then heating the polyethersulphone so formed under anhydrous conditions with a reagent of formula XCH$_2$COR, where X is halogen, preferably chlorine and R is as defined above. Examples of suitable reagents are chloroacetone and ethyl chloroacetate.

The period of heating with the reagent may be quite short (e.g. 1–3 hours) so that the preparations of the polyethersulphones of the present invention do not require a prolonged heating cycle as in the case when preparing polyethersulphones having dimsyl end groups. Moreover the polymers according to the invention are odourless. Coatings made from these polymers have excellent adhesion and do not exhibit microcracking.

The heating with the reagent of formula XCH$_2$COR may be effected in any suitable inert diluent, and in particular in an inert polar solvent for the polyethersulphone, preferably an aromatic sulphoxide or sulphone of formula L—S(O)$_x$—L' where x is 1 or 2 and L and L' are alkyl or aryl groups and may be the same or different. L and L' may together form a divalent radical. Preferred solvents include dimethyl sulphoxide, dimethyl sulphone, sulpholane (1,1-dioxothiolan) or aromatic sulphone of the formula

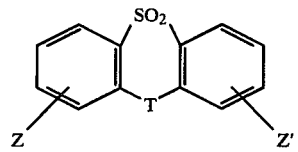

where T is a direct link, an oxygen atom or two hydrogen atoms (one attached to each benzene ring) and Z and Z' which may be the same or different, are hydrogen atoms or phenyl groups. An example of such an aromatic sulphone is diphenyl sulphone.

The polycondensation of the dialkali metal salt of a bisphenol such as bisphenol A [2,2-bis-(4-hydroxyphenyl) propane] with a dihalobenzenoid compound such as 4,4'-dichlorodiphenylsulphone in the presence of a sulphoxide or sulphone solvent is described in aforesaid British Pat. No. 1 078 234, and in J. Polymer Science Part A-1 5 1967 pages 2375 to 2398. In general the polycondensation proceeds relatively rapidly and, as disclosed in British Pat. No. 1 078 224, high molecular weight polymers were achieved using dimethyl sulphoxide as solvent, using bisphenols such as bisphenol A, in relatively short periods of time (in most cases considerably less than 10 hours) at temperatures of the order of 120° to 140° C. At pages 2379 to 2380 of the J. Polymer Science reference mentioned above it is indicated that for less reactive bisphenols, e.g. 4,4'-dihydroxydiphenylsulphone, polycondensation in another solvent, e.g. sulpholane, at higher temperatures is recommended.

In British Pat. No. 1 153 035 it is indicated that dihalobenzenoid compounds may be converted to polymers by heating the dihalobenzenoid compound with an alkali metal hydroxide in the presence of an inert solvent. In some cases, e.g. when using 4,4'-dihalodiphenylsulphone as the dihalobenzenoid compounds, alkali metal halophenates can be formed as intermediates. In the preferred process of British Pat. No. 1 153 035, a dihalobenzenoid compound is reacted with an aqueous alkali metal hydroxide in the presence of dimethyl sulphoxide and then the water is removed by azeotropic distillation. Another solvent, e.g. sulpholane, is then added and the dimethyl sulphoxide removed prior to effecting polycondensation at high temperatures.

In producing the polyethersulphones according to the invention it is necessary that the reaction system be anhydrous. To remove final traces of water it may be desirable to bubble an inert gas, e.g. nitrogen through the reaction mixture during the heating with the reagent of formula $XCH_2COR$ to sweep out such water.

Polycondensation of a halophenate, or dihalobenzenoid compound with a bisphenate (or bisphenol plus alkali metal carbonate or bicarbonate), gives rise to a polymer having halide and/or alkali metal phenate end groups depending on the stoichiometry of the reactants.

It is presumed that it is the phenate end groups of the polymer that are converted to groups of formula $-OCH_2COR$ by the reaction with the reagent of formula $XCH_2COR$. Hence it is desirable that the polyethersulphone, before reaction with the reagent of formula $XCH_2COR$ contains sufficient phenate end groups to produce a product with sufficient end groups according to the invention. The presence of sufficient phenate end groups can be ensured by using a slight excess of bisphenate when using the bisphenate/dihalo compound route or by the incorporation of a small amount of bisphenate when using the halophenate route. Alternatively, the polyethersulphone may be further treated with some bisphenate monomer.

The presence of an excess of the bisphenate compound also serves to regulate the molecular weight. This is particularly desirable when making low molecular weight polymers (which, as hereinafter described, are of particular utility in some applications).

The polymer should contain an effective number of the end groups which are or which contain groups of formula $-OCH_2COR$ for the purpose of achieving coatings of excellent adhesion which do not exhibit microcracking. Preferably the polymer contains at least three such end groups per 100 repeat units. The upper level for the number of such end groups is not thought to be critical, a typical upper level is 20 of such end groups per 100 repeat units and a typical range is 3–20 of such end groups per 100 repeat units.

For the purpose of adhesives and coatings we have found that the presence of groups of formula $-OCH_2COR$ is particularly beneficial with low molecular weight polyethersulphone, e.g. polyethersulphones having a reduced viscosity (as measured at 25° C. on a solution of the polymer in dimethyl formamide, the solution containing 1 g of polymer in 100 ml of solution) of less than 0.25 dl.g$^{-1}$, preferably between 0.03 and 0.2 and particularly between 0.08 and 0.18 dl.g$^{-1}$.

Such polyethersulphones may be made e.g. by employing an excess of bisphenate when using the bisphenate/dihalo route, or by including some bisphenate when using the halophenate route, or by terminating or sampling the polycondensation reaction when the polymer formed is still of low molecular weight.

It is found that such low molecular weight polyethersulphones flow at lower temperatures than higher (RV>0.3) molecular weight polymers and hence give continuous films more readily; nevertheless upon heating to, e.g. >300° C., they at least partially cross-link (through the end groups) thereby giving an entirely insoluble film.

As mentioned above, the $-OCH_2COR$ end group containing polyethersulphones are particularly useful for coatings or adhesives. To this end they may be applied to substrates by any of the customary ways for applying adhesives and coatings. For example the polyethersulphone may be applied as a solution or suspension, by brushing, impregnating, dipping or spraying, by laminating a film of the polymer to the surface, or by any other suitable techniques, such as for example (i) coating by melt extrusion of the polymer (ii) powder coating, or (iii) fluidised bed coating of a preheated solid surface. By the variety of coating techniques that may be used it is evident that surfaces of almost any shape and size can be coated.

The temperature of the polymer should not substantially exceed 300° C. prior to contact with the substrate because of the risk of cross-linking rendering application of the coating difficult.

The process of bonding surfaces together should be carried out at a temperature sufficiently high and with sufficient pressure between the surfaces to allow the aromatic polyethersulphone to flow. Butt or lap joints may be prepared, for example, by heating the surfaces together and allowing the bond to cool after optional further heating. Alternatively, the surfaces may be interleaved with polyethersulphone film whilst at ambient temperatures followed by pressing and heating. A similar process of pressing and heating may be used where the surfaces have been coated with polyethersulphone as hereinbefore described.

Solid surfaces according to the invention may be bonded together to form a two-ply laminate and any required number of such laminates may be similarly bonded together to form a multi-layer laminate having similar or dissimilar layers. The solid surfaces which are coated with and may be bonded together by the aromatic polyethersulphone are preferably those which are "wetted" by the aromatic polyethersulphone. Such surfaces include metals, vitreous surfaces and naturally occurring and synthetic resins, and the surfaces may be in the form of sheet, film, mouldings, powder, extrudate, and fibre. Metals that may be bonded include particularly cast iron, mild steel, stainless steel, titanium steel, titanium and aluminium and its alloys; vitreous surfaces include in particular glass, ceramic and enamelled materials; resins include in particular polyesters, polyolefines, polysulphones, polyimides, and polyamides as well as carbon fibres and cellulosic materials such as wood and wood products; the substrate may be a composite surface such as metal having a reinforcing coating, such as a sprayed ceramic and/or metal powder coating. The substrate may be in the form of sheet, tube, rod, wire, fibre, or woven fabric. A comprehensive list of adherents for polysulphones adhesives is given in British patent specification No. 1 136 766. A further feature of the adhesive bonds so formed is their resistance to high temperature so that, unlike many thermoplastic adhesives, prolonged usage at high temperatures (for example, greater than 200° C.) may be facilitated.

The aromatic polyethersulphone may be blended with other polymeric materials. The aromatic polyethersulphone may also contain any desired fillers, for example asbestos, glass, boron or carbon fibres or powdered metals. One particularly advantageous use of the $-OCH_2COR$ end group-containing polyethersulphones is in coating compositions in which a fluorocarbon polymer e.g. a tetrafluoroethylene polymer is dispersed in a solution or dispersion of such a polyethersulphone.

We have found that the —OCH$_2$COR end group-containing polyethersulphones of low molecular weight (RV 0.25) are of particular utility in this application.

To obtain satisfactory coatings from systems wherein the polyethersulphone is in the form of a dispersion in, e.g. water, the RV of the polyethersulphone must be below 0.25. It can in fact be very low—thus polyethersulphones of RV 0.03 have given good results. We prefer to use polyethersulphones of RV between 0.03 and 0.2 and in particular between 0.08 and 0.18. Polyethersulphones of RV > 0.08 are preferred since lower RV polyethersulphones are harder to make consistently on a commercial scale.

While we prefer to use a single polyethersulphone, blends may be employed. For example a mixture of polyethersulphones of RV below 0.25 may be used, alternatively; but less preferably, a polyethersulphone of RV above 0.25 may be used in admixture with one of RV below 0.25 provided that the RV of the mixture is below 0.25. Where two or more polyethersulphones are employed they may have the same or different repeat units.

It is desirable, in the interest of coating uniformity and dispersion stability, that the polyethersulphone has a particle size of below 25 μm, as measured by a Micromerograph (Pennwalt Corporation, Pennsylvania, U.S.A.), preferably below 20 μm. This may be achieved by ball milling the polyethersulphone. Preferably the polyethersulphone has a particle size above 5 μm because it becomes more difficult and time consuming to obtain polyethersulphone of smaller particle size. The use of low molecular weight polyethersulphones (RV below 0.25) also has the advantage that aqueous dispersions thereof can more easily be made than with high molecular weight polyethersulphones. Thus, while it may take a week or more to obtain such a particle size by ball milling a polyethersulphone of RV 0.42, a polyethersulphone of RV 0.21 can be ball milled, under similar conditions, to below 25 μm in less than 24 hours.

The compositions preferably have tetrafluoroethylene polymer/polyethersulphone weight ratios between 9:1 and 1:9, particularly between 4:1 and 1:3.

As the proportion of tetrafluoroethylene polymer is increased, the coatings made from the dispersions become softer and more porous and less strongly adherent to the substrate. On the other hand the non-stick properties of the coatings deteriorate as the proportion of polyethersulphone increases. We therefore particularly prefer to employ tetrafluoroethylene polymer/polyethersulphone weight ratios of between 0.75:1 and 2:1, most preferably between 0.9:1 and 1.4:1.

The dispersion preferably has a combined content of tetrafluoroethylene polymer and polyethersulphone of 20 to 50% by weight of the dispersion. The total solids content of the dispersion (i.e. weight of dispersed polymer plus any pigments, fillers, etc) is preferably 30 to 60% by weight of the dispersion.

The coating dispersion is preferably an aqueous dispersion on this avoids the presence of organic solvents which may present handling problems.

However in some cases the dispersion may be a dispersion of the tetrafluoroethylene polymer in a solution of the polyethersulphone in a solvent such as dimethyl formamide, N-methyl-2-pyrrolidone, dialkyl or diaryl sulphones and sulphoxides including 1,1-dioxothiolan (sulpholane).

Alternatively the tetrafluoroethylene polymer may be dispersed in a dispersion of a polyethersulphone in a mixture of diluents, e.g. water and dimethyl formamide.

However, as stated above, the polyethersulphone is preferably dispersed in water. Such an aqueous dispersion may be made by ball milling polyethersulphone powder or granules with water in the presence of an emulsifier, or by precipitation from solution.

An alternative method of making the polyethersulphone dispersion is by first making a solution of the polyethersulphone in a solvent such as methylene chloride, then forming an emulsion of that solution in water using a suitable emulsifier, e.g. sodium dioctyl sulphosuccinate, and finally evaporating off the solvent.

The tetrafluoroethylene polymer is preferably polytetrafluoroethylene or a copolymer of tetrafluoroethylene with up to 5%, especially 0.05 to 2%, by weight of other monomers such as ethylene, vinyl chloride, hexafluoropropene or perfluoropropyl perfluorovinyl ether; preferably the tetrafluoroethylene polymer is a "lubricant grade" polytetrafluoroethylene powder. Such materials, which are commercially available, e.g. as thermally or irradiation degraded polytetrafluoroethylene powders, are characterised by an average particle size of less than 20 μm (as measured optically). Examples of commercially available lubricant grade polytetrafluoroethylene powders are 'Fluon' L169, L170 and L171 sold by Imperial Chemical Industries Limited. For example 'Fluon' L170 is a friable polytetrafluoroethylene powder of 4 μm median particle size which can be broken down to smaller particle size when processed in various media, e.g. by a high shear mixer.

Other lubricant grade tetrafluoroethylene polymers that may be employed are telomers of tetrafluoroethylene made by polymerisation of tetrafluoroethylene to a low molecular weight e.g. by polymerisation in the presence of telogens. Such telomers can be obtained by telomerisation in an organic medium as described for example in U.S. Pat. Nos. 3,105,824 and 3,067,262, or in aqueous emulsion as described in British patent specification No. 1 391 246.

Thus coating dispersions may be made by mixing a lubricant grade polytetrafluoroethylene powder or dispersion into an aqueous polyethersulphone dispersion. Such mixing is conveniently performed using a high shear mixer.

The dispersions may also be made by dry mixing the polyethersulphone and a tetrafluoroethylene polymer powder and then forming a dispersion from the mixture.

Other ingredients, e.g. pigments, fillers, emulsifiers, viscosity modifiers, may be incorporated if desired. The incorporation of titanium dioxide as a pigment is particularly preferred as it beneficially affects the sedimentation behaviour of the dispersion and, in some case, the adhesion of the final coating. Preferred amounts of titanium dioxide are 1 to 10% by weight of the dispersion.

As disclosed in British patent specification No. 1 337 434 the incorportion of 0.01 to 10% by weight of diphenyl sulphone, based on the weight of the polyethersulphone, into the polyethersulphone may act as a processing aid and its incorporation into the dispersions of the present invention, e.g. prior to milling the polyethersulphone, may give coatings of better appearance.

While it is preferred to utilise lubricant grade polytetrafluoroethylene, it is also possible to utilise non-lubricant grade tetrafluoroethylene polymer e.g. as aqueous dispersions. Such dispersions may be made by polymerisation of tetrafluoroethylene in an aqueous medium, normally in the presence of an emulsifying agent. Examples of such processes are described in British patent specifications Nos. 689 400 and 821 353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. A suitable stabiliser is a non-ionic surfactant such as polyoxyethylated octyl phenol containing 9 to 10 moles of ethylene oxide per mole of octyl phenol sold by Rohm and Haas Company under the trademark 'Triton' X100 or a surfactant sold by Rohm and Haas Company under the trademark 'Triton' DN65 and described by the suppliers as a modified ethoxylated straight chain alcohol.

We have found that, while satisfactory coatings can be made by using mixtures of an aqueous low molecular weight (i.e. RV below 0.25) polyethersulphone dispersion with an aqueous tetrafluoroethylene polymer dispersion, similar coatings made using a high molecular weight (i.e. RV above 0.25) polyethersulphone not only were discontinuous but also exhibited inferior adhesion.

The substrates to which the coating compositions are applied should be clean and free from grease and unless they have a fritted surface are optionally roughened, for example by abrading by grit blasting or etching. Coatings may be applied by any of the conventional techniques, including spraying, dipping and brushing, followed by drying. The coating is then cured by heating, preferably in the presence of air, at temperatures of 300° C. to 450° C., preferably above 350° C. and particularly between 380° C. and 420° C.

The compositions are particular suitable for use in low friction coating applications where excellent performance is required, for example, resistance to environmental high temperatures, e.g. more than 150° C., consistent with good adhesion to substrates.

The compositions are particularly suited to coating cooking utensils for example frying pans, saucepans and bakeware or for oven linings. In making cooking utensils, a blank may be coated and then formed, or an already formed utensil may be coated.

The compositions may also be used to form adherent non-stick, low friction coatings on many other articles including industrial processing equipment including autoclaves, moulds, rollers, stirrers, mixers, chutes, hoppers and heat sealing jaws, domestic articles such as iron sole plates, food mixers and ice separators and tools such as saw blades, electrical applications such as for example wire insulation.

The service temperature that can be employed will depend on the nature of the polyethersulphone. Thus while coatings made from disersions containing polyethersulphone of repeat unit

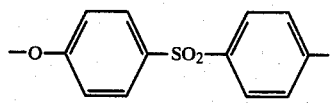

can be used for "top-of-the-stove" cookware, e.g. frying pans, saucepans, as well as ovenware, coatings made from dispersions containing polyethersulphone of repeat unit

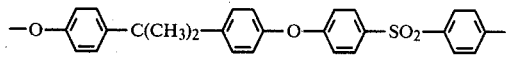

are best used in applications subjected to lower service temperatures, e.g. bakeware, egg boilers, and non-cooking utensil applications such as coatings on hair curlers and saws.

One particular non-cookware application for which the dispersions are particularly suited is the coating of glass cloth or other fabrics. For coating glass cloth, it is in some cases desirable to incorporate very fine glass beads in the coating dispersion. Such coated fabrics are of utility in the manufacture of air inflatable structures such as temporary aircraft hangers, exhibition halls etc.

Such solvent based dispersions may also be used for coating polyethersulphone film so as to provide a non-stick coating thereon.

The invention is illustrated by the following Examples.

EXAMPLE 1

A solution of a thermoplastic polyethersulphone having repeat units

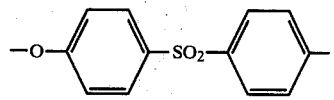

in dimethyl sulphoxide (155 g of polyethersulphone in 170 g of dimethyl sulphoxide), the polyethersulphone having 0.08 mole of OK end groups and a reduced viscosity of about 0.15, was heated to 100° C. under nitrogen with stirring on an oil bath. Ethyl chloroacetate (10.15 parts by weight, 0.08 mole) was added to the stirred solution over 8 minutes at 90° C., giving a slightly exothermic reaction. The solution was cooled a little and the temperature was held at 80°–84° C. for a further 2 hours, after which the solution was poured into vigorously stirred cold water (3000 parts by volume) to precipitate the polymer. The precipitated polymer was filtered off, macerated and extracted 6 times with distilled water to remove dimethyl sulphoxide. The polymer was then dried in vacuo overnight. The yield was 130.7 parts by weight of an odourless polymer containing about 17 —OCH$_2$COOC$_2$H$_5$ end groups per 100 repeat units—the end group analysis being effected by nuclear magnetic resonance (NMR) and infra red (IR) spectroscopy. The RV was 0.126.

EXAMPLE 2

A solution of a thermoplastic polyethersulphone having repeat units

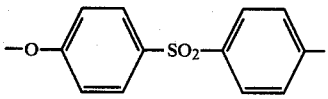

in dimethyl sulphoxide (155 g of polyethersulphone in 170 g of dimethyl sulphoxide), the polyethersulphone having 0.08 mole of OK end groups and a reduced viscosity of about 0.15, was heated to 72° C. under nitrogen with stirring on a an oil bath. Chloroacetone (7.7 parts by weight, 0.08 mole) was added to the stirred solution at 72° C. over 20 minutes, the temperature rising to 75° C. The temperature was held at 70° C. for a further 3 hours, after which the solution was poured into stirred cold water (3000 parts by volume). The precipitated polymer was filtered off, macerated and extracted 5 times with distilled water. 131.2 parts of an odourless polymer containing about 12.5 —OCH$_2$COCH$_3$ end groups per 100 repeat units and RV of 0.157.

EXAMPLES 4 TO 6

Aqueous dispersions of the polymers from Examples 1 and 2, and also from the polymer before treatment with ethyl chloroacetate and chloroacetone in these Examples, were made by ball milling for 21.5 hours, in a 1 liter capacity ceramic ball mill, the following ingredients:

Polymer: 75 g
Aqueous non-ionic surfactant solution: 15 g
Demineralised water: 166.70 g Coating dispersions were then prepared from these polymer dispersions by mixing, in a Silverson mixer:

Polymer dispersion: 146.3 g
'Fluon' L171 (a low molecular weight PTFE lubricant powder of median particle diameter 3 to 4 μm): 38.3 g
'Fluon' L170 (a low molecular weight PTFE lubricant powder of median particle diameter 4 to 5 μm): 4.3 g
Titanium dioxide: 10.6 g
Aqueous carbon black pigment paste: 11.0 g
Aqueous non-ionic surfactant solution: 2.4 g
Demineralised water: 21.3 g The aqueous non-ionic surfactant solution used to make the polymer and coating dispersions was an aqueous solution of an ethoxylated octyl phenol containing 10 moles of ethylene oxide per mole of octyl phenol; the solution contained 33⅓% by weight of the ethoxylated octyl phenol.

The coating dispersions were sprayed onto plain aluminium plates, dried at 80° C. for 15 minutes and then baked in an air oven at 400° C. for 15 minutes.

The coatings, which had a thickness of about 25-30 μm exhibited good adhesion when assessed by the following tests:

The coated plate is immersed in boiling water for 15 minutes and then dried. A cross-hatch pattern of cuts providing approximately 2 mm×2 mm squares over an area of 650 mm$^2$ is then applied to the coating using a razor blade to cut through the coating and into the metal. A length of 25 mm wide, pressure-sensitive, adhesive tape is firmly pressed over the cross-hatched area and the tape is subsequently pulled sharply backwards at an angle of 45° to the direction of application. The application, and removal, of tape to the cross-hatched area is repeated with fresh pieces of tape until there is evidence that the coating is detaching from the metal or, if no failure is observed, up to a maximum of 15 times. A coating that survives 5 applications is considered satisfactory. The adhesion can also be assessed qualitatively by the ease of peeling off the coating (after the immersion in boiling water) with a thumbnail after penetrating the coating with a scalpel to expose the aluminum substrate. The ease of removal is assessed on a scale of 5 (good adhesion) to 0 (poor adhesion). A grading of 4 or lower is recorded as a failure. The coatings of the Examples had gradings of 5. Thus by both tests the adhesion was satisfactory.

The appearance of the coatings was also assessed microscopically:

| Example No. | No. of —OCH$_2$COOC$_2$H$_5$ or —OCH$_2$COCH$_3$ end groups per 100 repeat units | Microscopic Appearance |
|---|---|---|
| 4 | 17, —OCH$_2$COOC$_2$H$_5$ | Matt, virtually crack free |
| 5 | 12.5, —OCH$_2$COCH$_3$ | Matt, very few cracks |
| 6 | 0 | Matt, cracked coating |

I claim:

1. An aromatic polyethersulphone containing repeat units of the general formula

—E—O—E'—O— or, where E is the same as E',

—E—O— in which E is the residuum obtained by the removal of the halogen atoms of a dihalobenzenoid compound in which each halogen atom is activated by an —SO$_2$— group ortho or para thereto, and E' is the residuum obtained by removal of the hydroxyl groups from a bisphenol; or where E is the same as E', it is the residuum obtained by the removal of the halogen atom and the hydroxyl group from a halophenol in which the halogen atom is activated by an —SO$_2$— group ortho or para thereto, said polyethersulphone having from 3 to 20 end groups of the formula —OCH$_2$COR where R is alkyl or alkoxy, per 100 repeat units.

2. An aromatic polyethersulphone according to claim 1 wherein the end groups are groups having the formula —OCH$_2$COCH$_3$ or —OCH$_2$COOC$_2$H$_5$.

3. An aromatic polyethersulphone according to claim 1 wherein the end groups have the formula

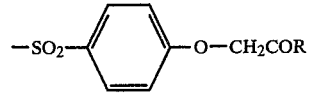

4. An aromatic polyethersulphone according to claim 1 wherein said polyethersulphone has a reduced viscosity, as measured at 25° C. as a solution of the polymer in dimethyl formamide; the solution containing 1 g of polymer in 100 ml of solution, of less than 0.25 dl.g$^{-1}$.

5. A process for the production of an aromatic polyethersulphone in which 3 to 20 of the end groups per 100 repeat units are groups having the formula —OCH$_2$COR where R is alkyl or alkoxy, wherein said process comprises heating
(i) an alkali metal halophenate, or
(ii) a mixture of substantially equimolar proportions of
(a) an alkali metal bisphenate, or
(b) a bisphenol and an alkali metal carbonate or bicarbonate, and a dihalobenzenoid compound,
in which halophenate or dihalobenzenoid compound each halogen atom is activated by an —SO$_2$— group ortho or para thereto, and then heating the polyethersulphone so formed under anhydrous conditions with a reagent of formula XCH$_2$COR, where X is halogen, and R is alkyl or alkoxy, to form the aromatic polyethersulphone.

6. A process according to claim 5 wherein the reagent of formula XCH$_2$COR is chloroacetone or ethyl chloroacetate.

* * * * *